Patented Apr. 3, 1951

2,547,747

UNITED STATES PATENT OFFICE 2,547,747

METHOD OF PRODUCING A BACON RIND PRODUCT

George A. Darrow, Glendale, Calif.

No Drawing. Application June 30, 1948, Serial No. 36,267

6 Claims. (Cl. 99—107)

This invention relates to a method of treating bacon rind or hog skin to form a product suitable for human consumption and particularly pertains to improvements in the method set forth in United States Patent No. 2,179,616 issued to me November 14, 1939.

An object of the invention is to provide a method of forming a highly palatable food product from sheets of bacon rind or hog skin such as are obtained by stripping the rind or skin from slabs of bacon in the production of sliced bacon in the packing house.

In the method set forth in the above recited patent the stripped bacon rind is initially cut into small pieces which are subjected to the action of steam pressure in a sealed cooker. The rind particles on being removed from the cooker will have substantially their original shape but will be shrunk to approximately one-half their original size and will be nearly free of fat. The pieces of rind are then allowed to cool after which they are cooked in oil or fat until the cells of the rind expand or explode thus puffing the rind particles. The operation in the recited method of first reducing the sheet rind into small pieces before effecting the initial cooking action in steam under pressure is objectionable in that it is difficult to cut the raw rind because of its toughness and pliability and because of its fatty character which properties also operate against cutting the rind with the desirable degree of uniformity. The product of this method consists of pieces of various shapes and sizes which renders the product difficult to pack both in handling and in weighing where it is desired to package the product in small containers with uniform quantities of the product by weight in the containers.

I have found that uniformity in the shapes, sizes and weight of the finished pieces as well as more thorough removal of fat and oil from the rind may be effected by initially cooking the sheets of stripped rind or skin in steam under pressure so as to remove the major portion of the fat therefrom and then grinding the sheets while warm into a mass and then forming the mass into at least substantially uniformally shaped pieces of substantially uniform wall thickness preparatory to a second cooking action in which expanding and puffing of the preformed pieces is effected. By so doing the product is not only improved in uniformity and lasting quality but its production is greatly facilitated with a considerable saving in time and resultant reduction in costs since the improved method lends itself to assembly line production.

The bacon rind employed in carrying out my method consists of the sheet rind or skin which is stripped from slabs of bacon; the rind being extremely tough and though pliable is sufficiently stiff to be self-supporting when stood on edge. It is characterized by an oil content and by a coating of fat on its inner surface, which constituents are undesirable in the production of the subject rind product and accordingly are intended to be removed.

The present method consists in first subjecting whole sheets of stripped bacon rind or skin to the action of steam under pressure at such pressure and temperature and for such length of time as to effect separation and removal of a major portion of the fat and oil associated therewith and also render the rind quite soft and pliable; the sheets at the conclusion of the pressure cooking operation being sufficiently soft that they will readily tear or separate under their own weight as when picked up by an edge thereof. In effecting the cooking operation the rind sheets are preferably loosely coiled on edge in a wire basket which is placed in a suitable autoclave where the requisite cooking of the sheet rind under pressure is effected. However, the sheet rind may be arranged in the autoclave in any other suitable fashion such that it will be subjected to the desired steam cooking action, such as by loosely piling the sheets in the cooking basket.

The time required for steam cooking of the sheet rind is variable according to the character of the rind under treatment and to the pressure and temperature employed which is also variable, the lower the pressure and temperature the longer the time required, and the greater the pressure and temperature the shorter the time. Another factor entering into the steam cooking period which renders such period variable is that bacon rind varies in its character as to its thickness and size, and according to the size, age of hogs and method of their feeding as well as to the breed of the animal from which the bacon is derived. The treatment accorded the rind in various packing houses varies its quality as to requirements of its treatment in the steam pressure cooking operation, such treatment including pickling, smoking or curing operations, and scalding and depilator methods employed in removing hair from the hogs. The variable conditions make it impossible to establish any fixed pressure cooking condition, it being necessary for the operator to determine the best pressure cooking operation for a particular batch of sheet rinds. However, the rind can be subjected to excessive cooking in this initial steam cooking action since such cooking can convert the rind into an undesired jellied or liquid state.

Without intent of limitation, since the stated factors are subject to variations, an example of a satisfactory cooking action is to subject the sheet bacon rind to the action of steam in a pressure cooker under steam pressure of approximately 40 pounds for a period of about 10 to 15 minutes. An example of a satisfactory cooking action in a shorter length of time is to subject the sheet bacon rind to the action of steam in a pressure cooker under a pressure of eighty pounds or thereabouts for a period of five to eight minutes or thereabouts. However, if it is found that requisite cooking has not been effected on examination of a cooked batch, the cooking may be resumed for another period of time according to the judgment of the operator, and likewise if on inspection of a cooked batch it is found that the rind has become excessively cooked the time of cooking of a succeeding batch may be shortened and so on until the proper condition of the cooked rind is obtained.

On completion of the pressure cooking operation the softened sheets of rind are removed from the cooker preferably while warm and converted into a soft, moist, doughy mass by grinding in a conventional meat grinder. In the grinding operation the ground mass is forced under pressure through small orifices at the discharge end of the grinder forming extruded strings of the mass which on standing form a heterogeneous plastic body.

The grinding of the rind being effected while it is warm, that is, at a temperature at which any oil or fat it might then contain will be in a fluid state, at least the greater portion of such oil or fat will be squeezed from the ground rind during the grinding action and on forcing the ground mass through the discharge orifices of the grinder such oil or fat on dripping from the grinder is collected in a receptacle apart from the ground mass and is thus separated therefrom.

The ground softened rind in a warm moist state and substantially free of grease is formed into a compact body which may be effected in various ways as in extruding the material from the grinder or in any other desired manner to form a strip or body of the compacted material of any desired cross section, or the material may be pressed into a mold or rolled into a sheet or strip. The requisite compact condition of the ground soft material may be obtained by allowing a mass thereof in a suitable receptacle to stand and cool. The ground material may be subjected to refrigeration, such as quick freezing, to render it solid and suitable for slicing.

Where the ground material is extruded the resultant strip may be of tubular form so that when sliced into short lengths the pieces will be in the form of small rings, or it may be of circular cross section to form disk like pieces when sliced transversely thereof, or it may be of any other sectional contour according to the shape to be imparted to the pieces. Likewise the material may be extruded as a ribbon and cut into lengths to form sticks.

After having formed the ground rind into a body of desired shape and requisite compactness it is reduced into small pieces as above indicated as by slicing or cutting, to reduce the material into small pieces of definite outline, but regardless of the mode of reducing the compressed mass of the rind into small pieces the essential feature of this step is to convert the mass into compact pieces of at least substantially uniform size, definite shape and uniform wall thickness. It is desirable to form the pieces with a thin wafer-like wall thickness but such thickness may be varied according to the desired wall thickness of the finished product.

The small pieces of compacted ground rind are then subjected to a puffing or expanding action; being preferably allowed to stand or otherwise treated as by mechanical refrigeration to effect aeration and drying thereof preliminary to such treatment, but not necessarily so since in some instances the puffing or expanding action may be effected immediately following the formation of the pieces. However, it is desirable to prolong the interval between formation of the pieces and the puffing or expanding action and to subject the pieces to mechanical or dry refrigeration during such interval, since such treatment imparts added crispness and fluffiness to the finished product. In refrigerating the pieces they are subjected to a temperature of 40° F. or less for any suitable length of time sufficient to chill the pieces.

The puffing or expanding treatment may be that or substantially that set forth in the patent aforesaid consisting in submerging and cooking the cut pieces of compacted ground rind in hot oil or fat having a temperature sufficient to cause the cells of the compacted particles of rind to puff or expand. Any suitable temperature of the cooking oil or fat may be used but as an example a temperature of 350 degrees Fahrenheit will serve the purpose although both higher and lower temperatures have proven satisfactory. The length of time required to effect this cooking operation is variable according to the cooking temperature of the hot oil or fat employed during the cooking operation and according to the nature of the compacted ground rind, which is determinable by the operator observing when the pieces have become properly cooked; the pieces being placed in wire baskets and submerged in the hot liquid in open kettles as is commonly practiced in deep fat cooking operations and being sufficiently cooked when they expand to their enlarged condition in which they become porous and crisp.

On completion of the cooking operation the pieces are removed from the oil or fat and drained, whereupon they are salted, preferably while warm, and on cooling are in readiness for packaging.

Various oils or fats may be employed in this final cooking operation. The use of a vegetable oil is desirable since it renders the product dry with longer shelf life but an animal fat may be used although it will render the product more oily and therefore either may be used according to taste. However, the more oil in or on the product the quicker it will become rancid and conversely the less oil in or on the product the longer it will remain fresh and free of rancidity. Where this mode of cooking the pieces in hot oil or fat is employed, the pieces may be deposited in the hot cooking liquid immediately after their formation, as by feeding the pieces directly into the cooking liquid from a slicing machine, either while the pieces are warm or after cooling thereof.

Another mode of cooking the pieces is by baking, in which event the pieces are placed on a metallic surface and baked in an oven at a suitable temperature and for such length of time as to enlarge the pieces and render them crisp and fluffy. A baking temperature of 350° F. has proven satisfactory and is given by way of example, but any other temperature which will effect the requisite cooking of the pieces without burning or scorching thereof may be employed. Such baking may be effected in an oven fitted with an endless conveyor for production purpose. The length of time required for the baking operation is variable and depends on the thickness or thinness of the walls of the pieces and upon the baking temperature employed; the thinner the pieces the higher the baking temperature the less time required and conversely the thicker the pieces or the lower the baking temperature the longer the baking time required.

On completion of the final cooking, salting and cooling of the pieces, they are placed in measured quantities in suitable containers of moisture proof material, such as bags of wax paper or cellulose plastic material and are thus marketed.

I claim:

1. The method of producing an edible hog skin product consisting in cooking the sheet skin as stripped from slabs of bacon in steam under pressure until the skin is soft and substantially free of fat and oil, reducing the cooked sheet into a doughy mass, forming the mass into pieces of substantially uniform size and shape, cooking the pieces until they become puffed, then salting and cooling the product.

2. The method of producing an edible hog skin product consisting in cooking sheet skin stripped from bacon slabs in steam under pressure until the skin becomes soft and substantially free of fat and oil, grinding the cooked skin to a doughly mass and removing more fat and oil, forming the mass into a compact body, reducing the body into small compact pieces, and cooking the pieces until they become expanded, porous and crisp, and then salting and cooling the resultant product.

3. The method of producing an edible hog skin product consisting in cooking sheet skin stripped from bacon slabs in steam under pressure until the skin becomes soft and substantially free of fat and oil, grinding the cooked skin to a doughly mass and removing more fat and oil, forming the mass into a compact body, reducing the body into small compact pieces, and cooking the pieces in hot fat until they become expanded, porous and crisp, and then salting and cooling the resultant product.

4. The method of producing an edible hog skin product consisting in cooking sheet skin stripped from bacon slabs in steam under pressure until the skin becomes soft and substantially free of fat and oil, grinding the cooked skin to a doughly mass and removing more fat and oil, forming the mass into a compact body, reducing the body into small compact pieces, and baking the pieces until they become expanded, porous and crisp, and then salting and cooling the resultant product.

5. The method which consists in grinding bacon rind which has been steam cooked until the rind has become soft and substantially free of fat and oil forming the mass into a compact body, reducing the body into small pieces, and cooking the pieces until they expand into crisp porous bodies.

6. The method which consists in grinding bacon rind which has been steam cooked until the rind has become soft and substantially free of fat and oil forming the mass into a compact body, reducing the body into small pieces, and baking the pieces until they expand into crisp porous bodies.

GEORGE A. DARROW.

REFERENCES CITED

The following references are of record in the file of this patent:

UNITED STATES PATENTS

| Number | Name | Date |
| --- | --- | --- |
| 2,179,616 | Darrow | Nov. 14, 1939 |
| 2,440,168 | Cross | Apr. 20, 1948 |